United States Patent
Chico et al.

(10) Patent No.: US 8,037,971 B2
(45) Date of Patent: Oct. 18, 2011

(54) LANDING GEAR, A BRAKE, A BRAKE-AND-WHEEL ASSEMBLY FOR AN AIRPLANE, AND A METHOD OF MAINTAINING SUCH LANDING GEAR

(75) Inventors: Philippe Chico, Boulogne-Billancourt (FR); Pierre Girod, Paris (FR)

(73) Assignee: Messier-Bugatti, Velizy-Villacoublay (FR)

(*) Notice: Subject to any disclaimer, the term of this patent is extended or adjusted under 35 U.S.C. 154(b) by 696 days.

(21) Appl. No.: 10/986,212

(22) Filed: Nov. 12, 2004

(65) Prior Publication Data

US 2005/0115778 A1   Jun. 2, 2005

(30) Foreign Application Priority Data

Nov. 14, 2003 (FR) ..................................... 03 13335

(51) Int. Cl.
    *F16D 55/36* (2006.01)
(52) U.S. Cl. ..................................... 188/18 A; 188/71.5
(58) Field of Classification Search ................. 188/71.5, 188/18 A, 73.2; 244/111
    See application file for complete search history.

(56) References Cited

U.S. PATENT DOCUMENTS

| 4,175,651 A | 11/1979 | Montalvo, Sr. et al. | |
| 6,003,640 A * | 12/1999 | Ralea | 188/71.5 |
| 6,003,641 A * | 12/1999 | Boehringer et al. | 188/71.5 |
| 6,095,293 A | 8/2000 | Brundrett et al. | |
| 6,581,730 B1 | 6/2003 | Haydon et al. | |
| 6,702,069 B2 * | 3/2004 | Ralea et al. | 188/71.5 |
| 2005/0056499 A1 * | 3/2005 | Narcy et al. | 188/71.6 |
| 2005/0269872 A1 * | 12/2005 | Ralea | 303/20 |

FOREIGN PATENT DOCUMENTS

| EP | 1084949 A2 * | 3/2001 |
| WO | WO 0120188 A1 * | 3/2001 |
| WO | WO 2005001303 A2 * | 1/2005 |

* cited by examiner

*Primary Examiner* — Thomas J Williams
(74) *Attorney, Agent, or Firm* — Sughrue Mion, PLLC

(57) ABSTRACT

The invention provides airplane landing gear comprising at least one axle for carrying at least one brake-and-wheel assembly comprising a rim mounted to rotate on the axle and a stack of disks and a support carrying modular electromechanical actuators that are individually removable, the landing gear and the brake-and-wheel assembly being organized in such a manner that each actuator is in at least one of the following configurations:

an empty space of dimensions sufficient for receiving the actuator extends on a disassembly path directly facing the actuator when it is in an operating position;

the actuator is associated with displacement means enabling it to be moved from an operating position to a disassembly position, an empty space of dimensions sufficient to receive the actuator extending along a disassembly path directly facing the actuator when it is in the disassembly position.

8 Claims, 6 Drawing Sheets

FIG_1

FIG_2

FIG_4

FIG_6
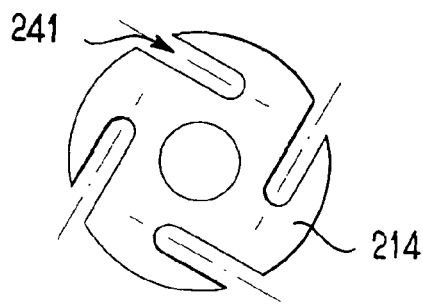
FIG_7
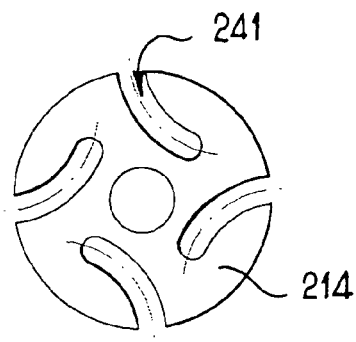
FIG_8
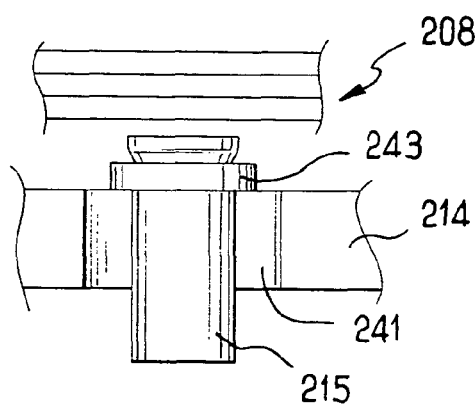
FIG_9
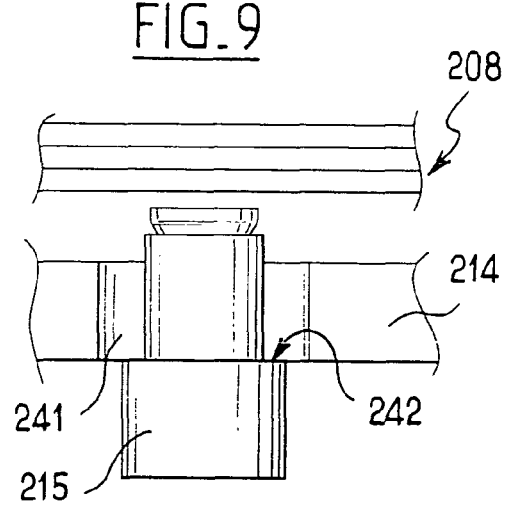
FIG_10
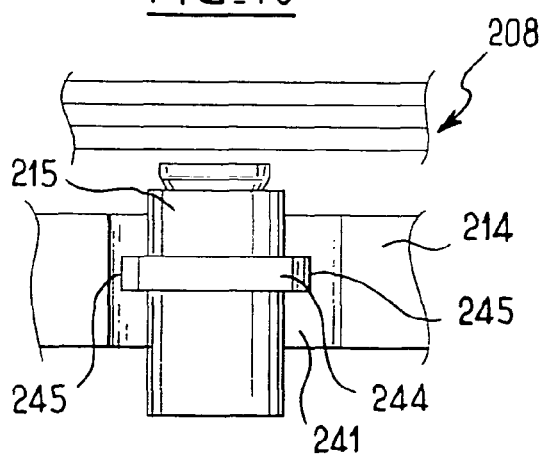
FIG_11
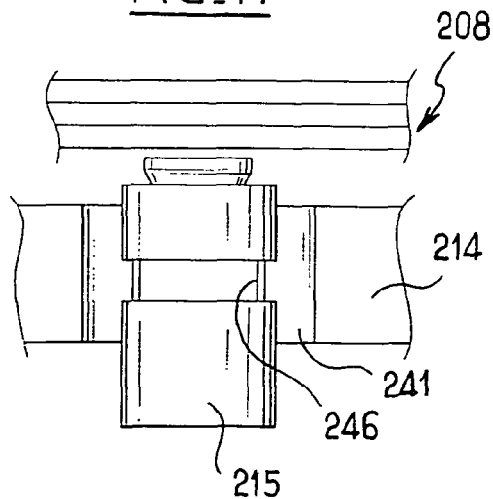

LANDING GEAR, A BRAKE, A BRAKE-AND-WHEEL ASSEMBLY FOR AN AIRPLANE, AND A METHOD OF MAINTAINING SUCH LANDING GEAR

The invention relates to landing gear, a brake, a brake-and-wheel assembly for an airplane, and a method of maintaining such landing gear.

BACKGROUND OF THE INVENTION

U.S. Pat. No. 6,095,293 discloses a brake for an airplane wheel, the brake comprising a stack of disks having a central axis and a braking torque-takeup structure carrying modular electromechanical actuators that can be removed individually and that extending facing the stack of disks in order to apply pressure to the stack of disks in controlled manner.

The actuators are designed to be removed from the side of the torque-takeup structure that is remote from the stack of disks.

Nevertheless, in certain circumstances, it can happen that the space between the torque-takeup structure and the landing gear is too small to enable an actuator to be removed in that direction. In this respect, reference can be made to FIG. 1 of the above-cited document which shows an actuator fitted to an airplane brake, and disposed, when the brake is mounted on airplane landing gear, directly facing the structure of the landing gear so that it cannot be removed.

It is then necessary to remove the wheel and then the brake in order to be able to remove an actuator disposed in such a manner, thereby making in situ maintenance of such a brake very awkward for the company using such an airplane. Such a disposition makes it necessary to put the airplane on a jack, to remove the wheel, and then the stack of disks, before finally being able to remove the torque-takeup structure in order to access the actuator concerned. That amount of manipulation rules out any in situ maintenance limited merely to replacing the actuator. If a company is going to have to disassemble the entire brake-and-wheel assembly, then it will prefer replacing said assembly with another assembly, and taking the removed assembly into a workshop for maintenance.

U.S. Pat. No. 6,581,730 discloses a brake-and-wheel assembly including actuators carried by a support that is secured to the landing gear.

Although such actuators are configured so as to enable them to be removed from the support without disturbing the brake assembly made up of the stack of disks and the torsion tube, that is nevertheless not sufficient to enable the actuator to be removed from the airplane without removing the wheel. FIG. 2 of that document also shows the situation in which the actuators are not directly removable because they come into abutment against the rim of the wheel. It is therefore necessary to put the airplane on a jack and remove the wheel, which means that there is no advantage in being able to remove the actuators individually.

OBJECT OF THE INVENTION

An object of the invention is to provide airplane landing gear fitted with a brake-and-wheel assembly in which the brake includes electromechanical actuators that can be removed individually, with it being possible for all of them to be replaced directly on the airplane without it being necessary to put the airplane on a jack in order to remove the wheel or the stack of disks associated with the brake. Another object of the invention is to provide a brake-and-wheel assembly, and a brake that are specially adapted for achieving this object.

BRIEF SUMMARY OF THE INVENTION

The invention provides airplane landing gear comprising at least one axle for carrying at least one brake-and-wheel assembly comprising a wheel with a rim mounted to rotate on the axle, a stack of disks arranged to apply braking torque to the wheel in response to pressure applied to the stack of disks, and a support carrying modular electromechanical actuators that can be removed individually extending facing the stack of disks in order to apply pressure in controlled manner to the stack of disks. According to the invention, the landing gear and the brake-and-wheel assembly are shaped in such a manner that each actuator is in at least one of the following configurations:

empty space of dimensions sufficient for receiving the actuator extends on a disassembly path directly facing the actuator when it is in an operating position;

the actuator is associated with displacement means enabling it to be moved from an operating position to a disassembly position, an empty space of dimensions sufficient to receive the actuator extending along a disassembly path directly facing the actuator when it is in the disassembly position.

By means of these dispositions of the invention, all of the actuators are easy to remove without removing the wheel or the stack of disks. In situ maintenance then becomes feasible, both technically and economically.

In a first particular embodiment of the invention, the actuators are designed to be removed from a side of the support remote from the stack of disks, the axle being of a length that is sufficient to leave an empty space extending facing each actuator on said side of the stack of disks in an axial direction parallel to the axle.

In a second particular embodiment of the invention, the displacement means comprise at least a support portion which is releasable and movable after being released to move at least one actuator from an operating position to its disassembly position.

In a particular arrangement, the support for the actuators is releasable as a unit.

In which case, preferably, the support is guided to turn relative to the landing gear in such a manner as to make it possible, once it has been released, to move at least one actuator by turning from its operating position towards its disassembly position.

In a third particular embodiment of the invention, the actuators are designed to be removed from the support along a disassembly trajectory extending substantially in a plane perpendicular to an axis of rotation of the wheel.

In this respect, the invention also provides a brake for an airplane wheel, the brake comprising a stack of disks having a central axis and a support carrying at least one modular electromechanical actuator that is individually removable extending facing the stack of disks to apply pressure on the stack of disks in controlled manner, the brake being arranged in such a manner that the actuator is removable along a disassembly trajectory extending substantially in a plane perpendicular to the central axis of the stack of disks without removing the stack of disks.

Preferably, the disassembly trajectory extends along a direction that is substantially rectilinear and intersects the central axis.

In a variant, the disassembly trajectory extends in a direction that is substantially rectilinear and does not intersect the central axis. In another variant, the disassembly trajectory includes a curved portion.

In a particular aspect of the invention, the support includes a guide portion for guiding the actuator along the disassembly trajectory.

The invention also provides a brake-and-wheel assembly comprising a rim having an axis of rotation, a stack of disks having a central axis coinciding with the axis of rotation of the rim and arranged to apply braking torque to the rim in response to pressure applied to the stack of disks, a support carrying at least one modular electromechanical actuator that is individually removable and that extends facing the stack of disks to apply pressure on the stack of disks in controlled manner, the brake-and-wheel assembly being arranged, according to the invention, in such a manner that the actuator is removable along a disassembly trajectory that extends substantially in a plane perpendicular to the central axis, while removing neither the wheel nor the stack of disks.

Finally, the invention provides a method of maintaining landing gear, the method including the step of identifying an actuator that needs to be replaced, of removing it while removing neither the wheel nor the stack or disks, and replacing it with another actuator, which method includes, according to the invention, the step of causing a pusher of the actuator for replacement to retract prior to removing the actuator.

BRIEF DESCRIPTION OF THE DRAWINGS

The invention will be better understood in the light of the following description given with reference to the accompanying drawings, in which:

FIGS. 6 and 7 are diagrams of variant embodiments of the FIG. 5 ring; and

FIGS. 8 to 11 are diagrams of variant embodiments of the ring guides for receiving the actuators.

DETAILED DESCRIPTION OF THE INVENTION

Figure 1:
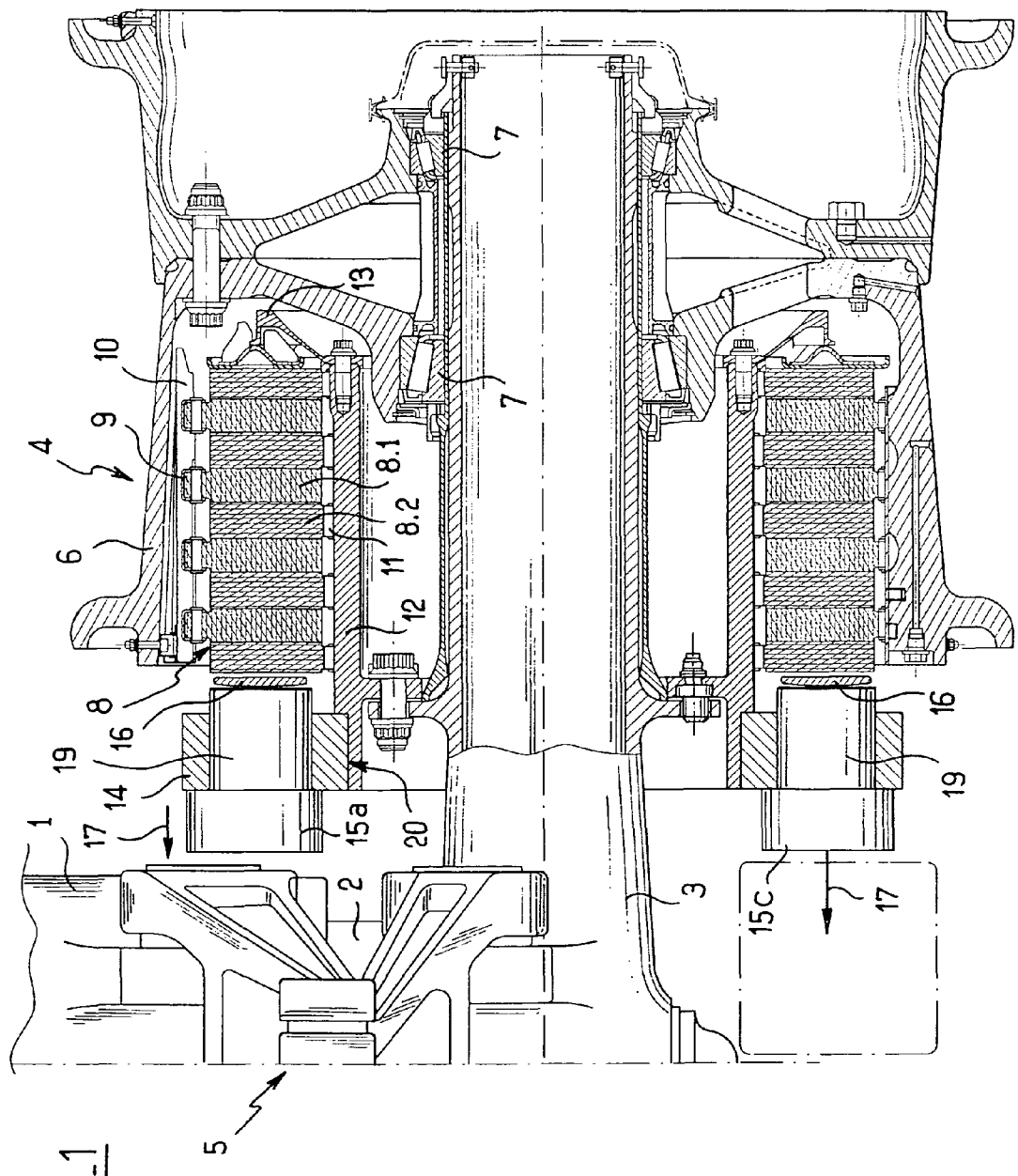
FIG. 1 is a half-view, partially in section, showing landing gear fitted with a brake-and-wheel assembly constituting a particular embodiment of the invention.
Figure 2:
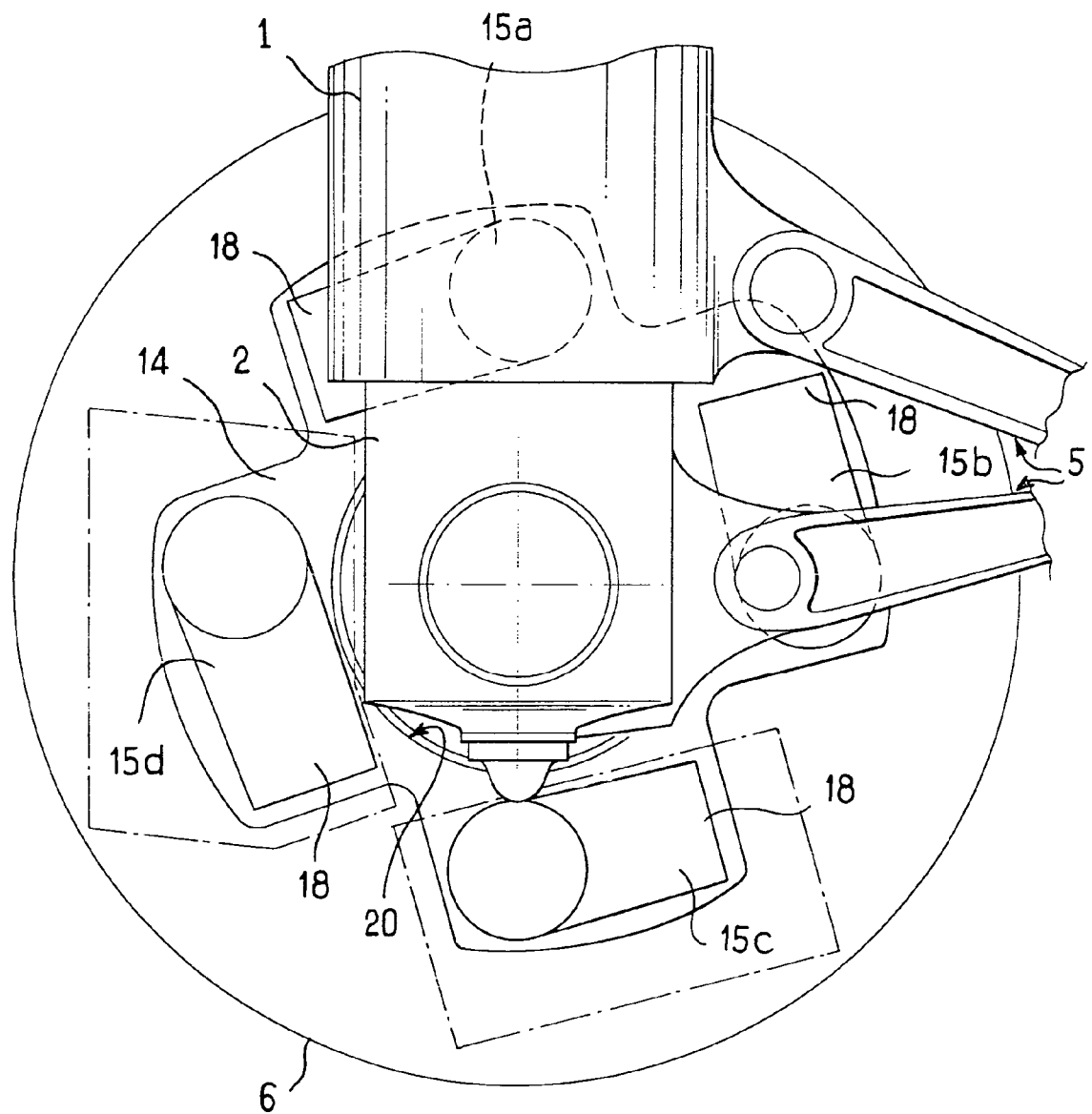
FIG. 2 is a diagrammatic fragmentary side view of the FIG. 1 landing gear.

In a first embodiment of the invention as shown in FIGS. 1 and 2, the airplane landing gear comprises a strut 1 in which a rod 2 slides. The strut 1 is hinged to the airplane and is stabilized in its down position by a bracing device (not shown). The rod 2 carries an axle 3 at its bottom end for receiving a brake-and-wheel assembly 4. The rod 2 is prevented from turning in the strut 1 by a scissors link 5 comprising two branches hinged respectively to the strut 1 and to the rod 2.

The brake-and-wheel assembly comprises a wheel having a rim 6 which carries a tire (not shown) and which is mounted to rotate on the axle 3 via bearings 7.

In the description below, the term "axial direction" is used to designate a direction parallel to the axis of the rim 6 while it is mounted on the axle 3, the term "radial direction" is used to designate a direction perpendicular to the preceding direction and intersecting the axis of the rim 6, and finally the term "lateral direction" is used to designate a direction perpendicular to the two preceding directions.

Inside the rim 6 there extends a stack of disks 8 having a central axis that coincides with the axis of rotation of the rim 6. The stack of disks 8 comprises, in alternation: rotor disks 8.1 (only one of them is referenced) which are constrained to rotate with the rim 6 by having appendices 9 engaging in fluting 10 extending inside the rim 6; and stator disks 8.2 (only one of which is referenced) which are constrained to remain stationary by having appendices 11 engaged in fluting (not shown) in a torque-takeup tube 12 bolted onto the axle 3.

The stack of disks 8 extends between a stationary end wall 13 fitted on the torque-takeup tube 12, and a ring 14 also fitted on the torque-takeup tube 12 (by fastening bolts, not shown). The ring 14 carries modular electromechanical actuators 15, each having a pusher 16 that can be moved towards the stack of disks 8 by means of an electric motor 18 (visible in FIG. 2) in order to apply pressure in controlled manner against the stack of disks 8.

The actuators 15 are fastened in removable manner to the ring 14 (by means of fastening bolts, not shown), and they are designed to be removed from the side of the ring 14 that is remote from the stack of disks 8, i.e. in the axial direction towards the strut 1 and the rod 2. Each actuator 15 includes a casing portion 19 which extends through the ring 14. Arrows 17 in FIG. 1 represent the direction in which the actuators are removed.

As can be seen particularly clearly in FIG. 2, the actuators 15*a* and 15*b*, when in the position shown, directly face the structure of the landing gear in the direction 17, so that they cannot be removed. However, the actuators 15*c* and 15*d* face respective empty spaces that extend in front of said actuators in the direction 17, enabling them to be removed in that direction. These empty spaces are symbolized in FIGS. 1 and 2 by zones outlined in chain-dotted lines.

In order to enable the actuators 15*a* and 15*b* to be removed from the airplane, the invention provides for the ring 14 to be fitted to a circular cylindrical bearing surface 20 of the torque-takeup tube 12. In order to remove the actuators 15*a* or 15*b*, it then suffices to undo the fastening bolts connecting the ring 14 to the torque-takeup tube 12 and then turn the ring 14 on the bearing surface 20 so as to bring the actuators 15*a* or the actuator 15*b* into a disassembly position (for example that occupied in operation by the actuator 15*c* or the actuator 15*d*). In this position, the actuators 15*a* or 15*b* can easily be removed.

The bearing surface 20 is particularly advantageous in that it enables the ring 14 to be guided easily in turning without any risk of dropping onto the axle 3.

In a variant (not shown) of this embodiment, the ring 14 is no longer fitted to the torque-takeup tube 12, but is fitted directly to the axle 3. The bearing surface 20 is then provided on a portion of the axle 3 for rotatably receiving the ring 14.

In another variant that is not shown, the ring is not designed to be movable as a whole after it has been disconnected. At least one actuator that cannot be removed when it is in its operating position is then mounted on a moving portion of the ring so as to enable said actuator to be brought into a disassembly position where it faces an empty space.

Figure 3:
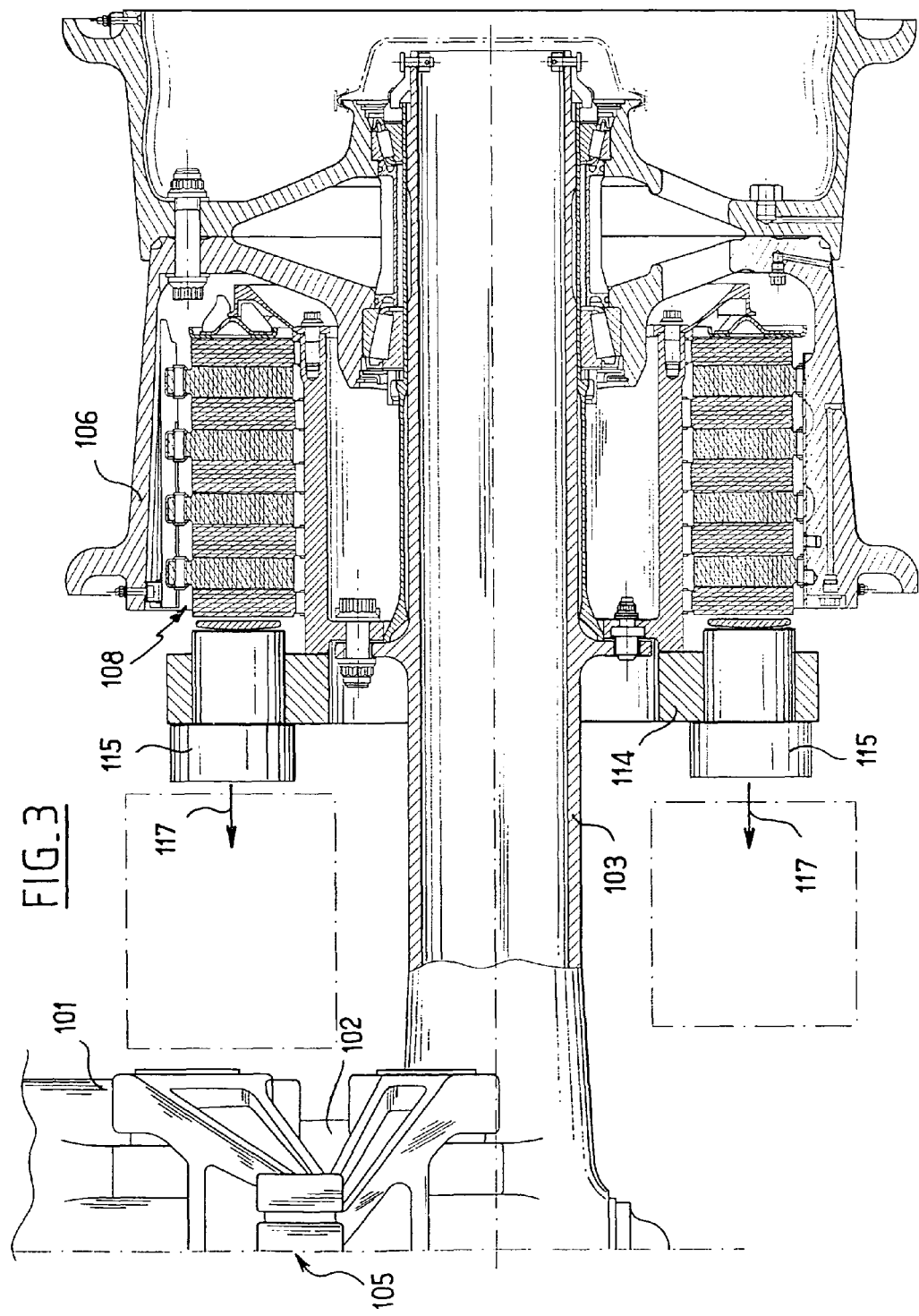
FIG. 3 is a view analogous to FIG. 1, showing landing gear fitted with a brake-and-wheel assembly constituting a second particular embodiment of the invention.

In a second embodiment of the invention as shown in FIG. 3 (in which references for elements corresponding to those given references above have had 100 added thereto), the actuators 115 are still designed to be removed in the axial direction as symbolized by the arrow 117. In this case, the axle 103 is of sufficient length to leave empty space facing all of the actuators including those directly facing the landing gear in the axial direction. In this case, the operating positions of all of the actuators are also disassembly positions. It is then possible to remove the actuators without it being necessary to turn the ring 114.

This particular embodiment means that there is no longer any need to provide a support for the actuators that is separable and movable, as in the above embodiment, thereby simplifying the general design of landing gear and of the brake-and-wheel assembly.

Nevertheless, the length given to the axle 3 in this way has the consequence of increasing the weight of the landing gear and also of increasing its size.

Figure 4:
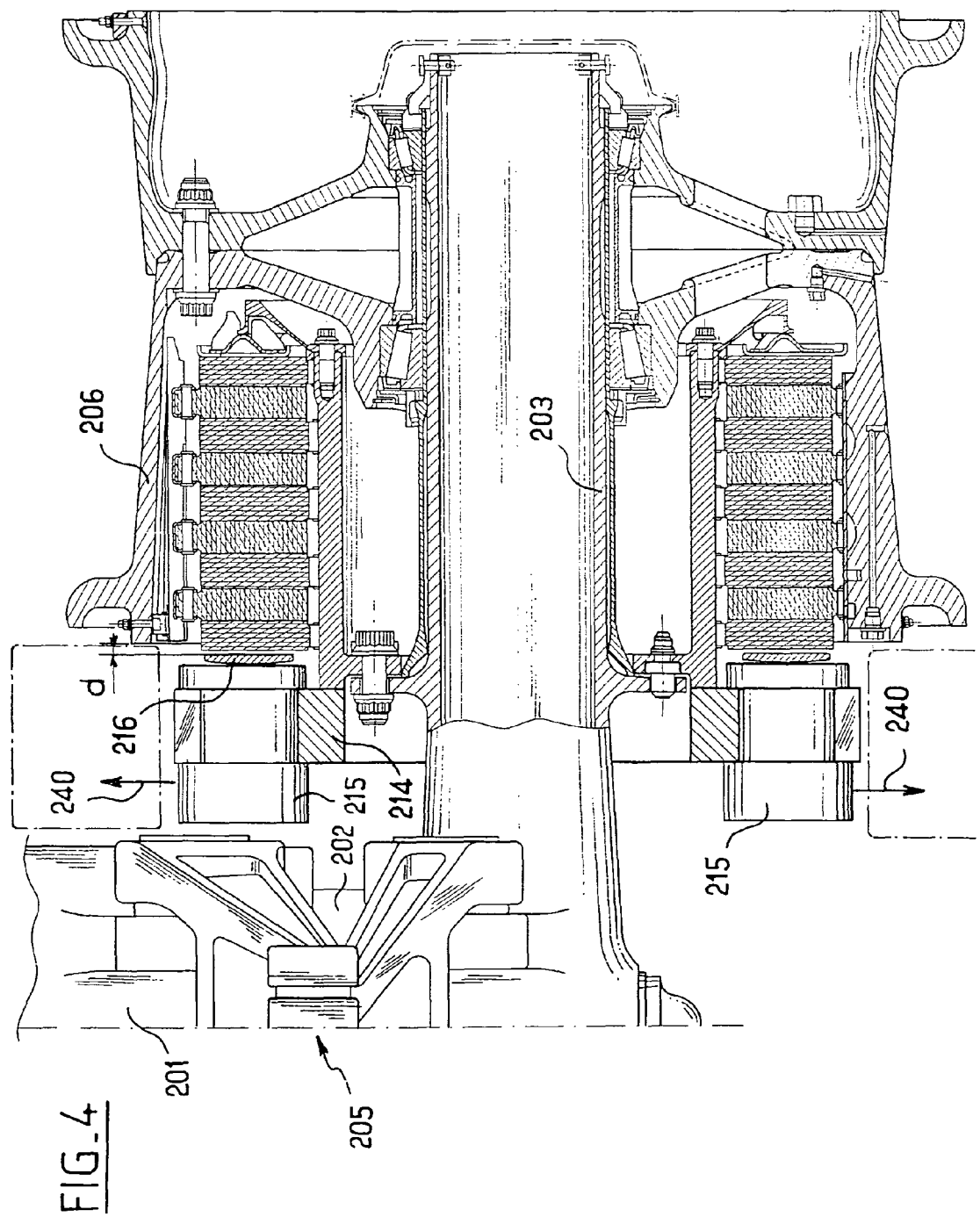
FIG. 4 is a view analogous to FIG. 1, showing landing gear fitted with a brake-and-wheel assembly constituting a third particular embodiment of the invention.
Figure 5:
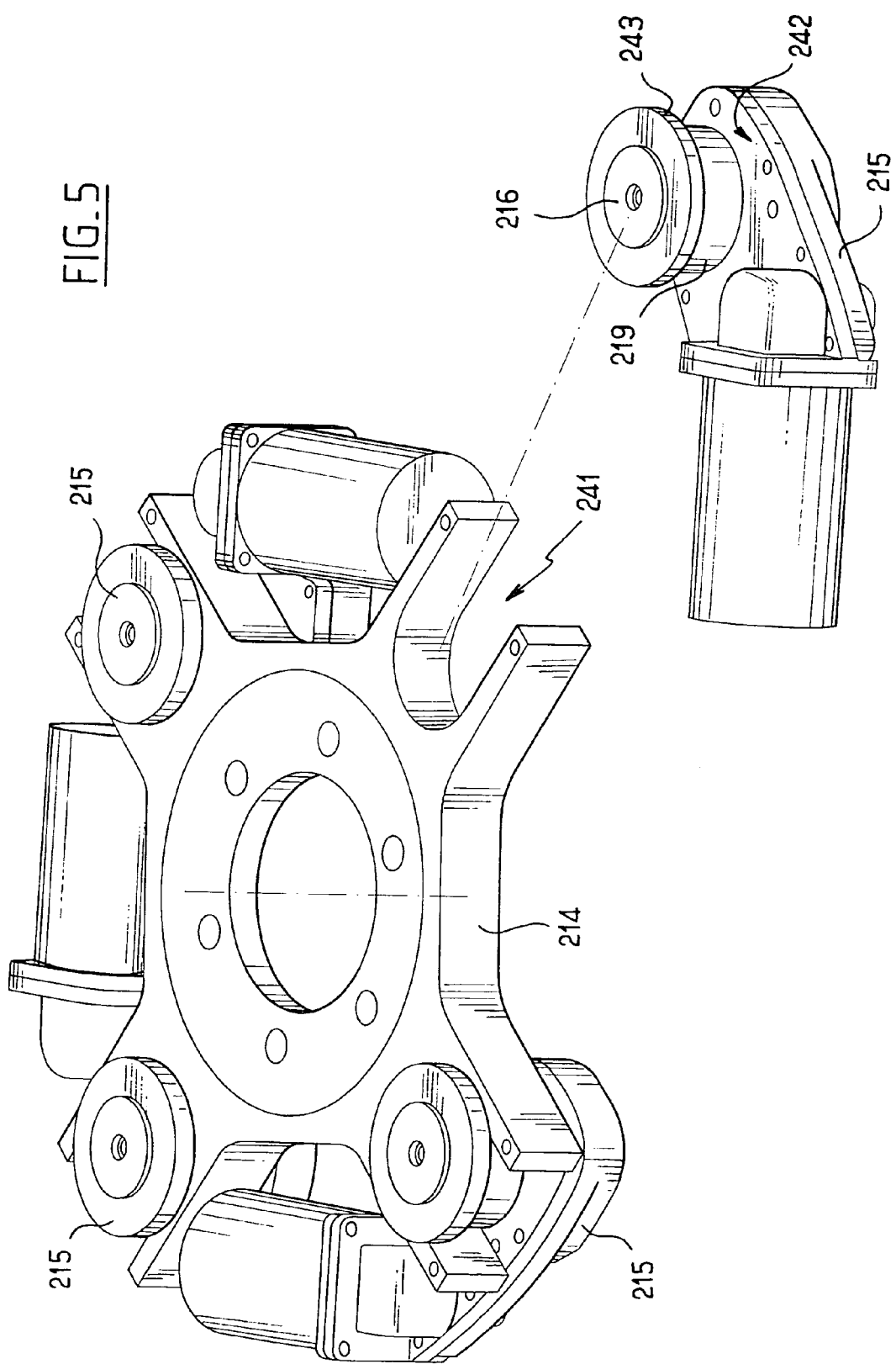
FIG. 5 is a perspective view of the ring supporting the actuators and fitted to the brake-and-wheel assembly shown in FIG. 4.

These drawbacks are avoided in a third particular embodiment of the invention as shown in FIGS. 4 and 5 in which references for elements corresponding to elements referenced above are again increased by 100.

The actuators 215 and the ring 214 are designed so that the actuators can be removed in a direction 240 that is essentially radial, intersecting the axis of the wheel 206.

As can be seen particularly clearly in FIG. 4, the empty spaces that receive the actuators while they are being removed are then situated facing the peripheral edge of the ring, thus making it possible to shorten the axle 203 to the length that is strictly necessary while, in this case also, avoiding any need to provide for a ring that is separable.

In order to make such disassembly possible and, as shown in FIG. 4, it is important to make sure, at least when the pusher 216 is in the retracted position, that the pusher is set back relative to the wheel 206 by the distance d measured between the outside face of the pusher 216 and the tip of the rim 206.

In any event, it is advantageous to cause the pusher 216 to retract prior to removing the actuator 215, firstly in order to reduce the size of the actuator 215 while it is being handled, and secondly to protect the pusher against possible impact.

As can be seen in FIG. 5, the ring 214 has U-shaped radial extensions 241 forming guides both for assembling and for disassembling an actuator 215. In order to make the actuator easier to put into place, the casing portion 219 which extends through the ring 214 is defined firstly by a flank 242 of the actuator casing, and secondly by a collar 243. The flank 242 and the collar 243 are spaced apart by a distance that is slightly greater than the thickness of the branches of the U-shape of the radial extension 241, and the branches of the U-shape are spaced apart by a distance that is slightly greater than the diameter of the casing portion 219 so that the radial extension serves to provide guidance not only in the lateral direction, but also in the axial direction.

This guidance makes it considerably easier to remove or install actuators, particularly for the actuators which are situated below the axle, in a portion of the landing gear that is difficult to observe in situ.

In a variant shown in FIG. 6, the guides 241 define a disassembly direction which does not intersect the central axis of the ring 214. This freedom enables a variety of orientations to be selected for the disassembly directions of the actuators, and said directions may even be different from one actuator to another.

In the variant shown in FIG. 7, the guides 241 need not be rectilinear, but may be curved, at least in part.

In any event, it is important for the disassembly trajectory to extend substantially in a plane perpendicular to the central axis of the ring, which coincides with the central axis of the wheel or of the stack of disks. Still within the ambit of the invention, it is possible for the disassembly trajectory to include a small axial component.

In another aspect of the invention as shown in FIGS. 8 to 11, axial guidance of an actuator 215 can be provided in several ways. In a first variant shown in FIG. 8, the actuator 215 presses against the ring 214 solely on the side thereof that is facing the stack of disks 208, via the collar 243. Guidance in the axial direction is therefore not positive. Nevertheless, having pressure applied on one side only is sufficient to make it easy to put the actuator 215 into place.

In the variant shown in FIG. 9, the actuator presses against the ring 214 solely on its side facing away from the stack of disks 208.

In the variant shown in FIG. 10, the actuator has a collar 244 which is engaged in complementary grooves 245 formed in the branches of the U-shape of the radial extension 241. Conversely, in a variant shown in FIG. 11, the actuator has a groove 246 to receive complementary tenons 247 projecting inwards from the branches of the U-shape of the radial extension 241.

The invention is not limited to the particular embodiments of the invention described above, but on the contrary covers any variant coming within the ambit of the invention as defined in the claims.

What is claimed is:

1. Airplane landing gear comprising at least one axle for carrying at least one brake-and-wheel assembly comprising:
   a wheel having a rim mounted to rotate on the axle,
   a brake including a stack of disks arranged to apply braking torque to the wheel in response to pressure applied to the stack of disks, and a support carrying modular electromechanical actuators that can be removed individually and that extend facing the stack of disks in order to apply pressure in controlled manner to the stack of disks,
   wherein the landing gear and the brake-and-wheel assembly are shaped in such a manner that each actuator is in at least one of the following configurations:
   an empty space of dimensions sufficient for receiving the entire actuator extends on a disassembly path directly facing the actuator when it is in an operating position;
   the actuator is associated with displacement means enabling it to be moved from an operating position to a disassembly position, an empty space of dimensions sufficient to receive the entire actuator extending along a disassembly path directly facing the actuator when it is in the disassembly position, such that each actuator is removable from the support without disturbing the brake-and-wheel assembly.

2. Landing gear according to claim 1, wherein the actuators are designed to be removed from a side of the support remote from the stack of disks, the axle being of a length that is sufficient to leave an empty space extending facing each actuator on said side of the stack of disks in an axial direction parallel to the axle.

3. Landing gear according to claim 1, wherein the displacement means comprise at least a support portion which is releasable and movable after being released to move at least one actuator from an operating position to its disassembly position.

4. Landing gear according to claim 3, wherein the support for the actuators is releasable as a unit.

5. Landing gear according to claim 4, wherein the support is guided to turn relative to the landing gear in such a manner as to make it possible, once it has been released, to move at least one actuator by turning from its operating position towards its disassembly position.

6. Landing gear according to claim 1, wherein the actuators are designed to be removed from the support along a disassembly trajectory extending substantially in a plane perpendicular to an axis of rotation of the wheel.

7. A brake-and-wheel assembly comprising a rim having an axis of rotation, a stack of disks having a central axis coinciding with the axis of rotation of the rim and arranged to apply braking torque to the rim in response to pressure applied to the stack of disks, a support carrying at least one modular electromechanical actuator that is individually removable extending facing the stack of disks to apply pressure on the stack of disks in controlled manner, the assembly being arranged in such a manner that the entire actuator is removable along a disassembly trajectory extending substantially in a plane perpendicular to the central axis, while removing neither the rim nor the stack of disks.

8. A method of maintaining landing gear comprising at least one axle for carrying at least one brake-and-wheel assembly comprising a wheel with a rim mounted to rotate on the axle, a stack of disks arranged to apply braking torque to the wheel in response to pressure applied to the stack of disks, and a support carrying modular electromechanical actuators that can be removed individually and that extend facing the stack of disks in order to apply pressure in controlled manner to the stack of disks, the method comprising:
  identifying an actuator to be replaced;
  causing a pusher of said actuator to retract;
  removing said actuator as a whole without removing the rim or the stack of disks; and
  replacing said actuator by another actuator.

\* \* \* \* \*